United States Patent
Maeda (10) Patent No.: US 12,157,474 B2
(45) Date of Patent: Dec. 3, 2024

(54) METHOD FOR DETERMINING STATE OF ROAD SURFACE

(71) Applicant: SUMITOMO RUBBER INDUSTRIES, LTD., Kobe (JP)

(72) Inventor: Yusuke Maeda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 424 days.

(21) Appl. No.: 17/826,510

(22) Filed: May 27, 2022

(65) Prior Publication Data

US 2022/0379897 A1 Dec. 1, 2022

(30) Foreign Application Priority Data

May 31, 2021 (JP) ................................. 2021-091815

(51) Int. Cl.
  *B60W 50/00* (2006.01)
  *B60W 40/064* (2012.01)

(52) U.S. Cl.
  CPC .......... *B60W 40/064* (2013.01); *B60W 50/00* (2013.01); *B60W 2050/0052* (2013.01); *B60W 2520/26* (2013.01); *B60W 2520/28* (2013.01)

(58) Field of Classification Search
  USPC ..................................................... 701/70–98
  See application file for complete search history.

(56) References Cited

U.S. PATENT DOCUMENTS

| | | | | |
|---|---|---|---|---|
| 4,779,696 A | * | 10/1988 | Harada | B60T 8/175 180/197 |
| 5,201,382 A | * | 4/1993 | Edahiro | B60T 8/175 180/404 |
| 2003/0121319 A1 | * | 7/2003 | Kojima | B60C 23/061 73/146.2 |
| 2005/0179528 A1 | * | 8/2005 | Kawasaki | B60C 23/061 340/443 |
| 2009/0088918 A1 | * | 4/2009 | Takenaka | B60T 8/17551 701/31.4 |

(Continued)

FOREIGN PATENT DOCUMENTS

DE 10 2018 203 545 A1 9/2017
EP 1 302 378 A2 4/2003

(Continued)

OTHER PUBLICATIONS

Extended European Search Report for European Application No. 22173995.6, dated Oct. 31, 2022.

*Primary Examiner* — Jonathan L Sample
(74) *Attorney, Agent, or Firm* — Birch, Stewart, Kolasch & Birch, LLP (57) ABSTRACT

A determining method for determining a state of a road surface includes: sequentially acquiring a rotational speed of tires mounted on the vehicle, sequentially acquiring a driving force of the vehicle, calculating a slip ratio based on the sequentially acquired rotational speed of the tires, calculating a regression equation and a confidence interval width for a relationship between the slip ratio and the driving force, based on data sets of the slip ratio and the driving force in a predetermined zone, and determining a state of the road surface on which the vehicle travels, based on the confidence interval width calculated for the predetermined zone.

9 Claims, 6 Drawing Sheets

(56) References Cited

U.S. PATENT DOCUMENTS

| | | | |
|---|---|---|---|
| 2009/0319200 A1* | 12/2009 | Satonaka | G01M 17/0072 |
| | | | 73/146 |
| 2016/0214486 A1* | 7/2016 | Suzuki | B60L 50/52 |
| 2016/0221446 A1* | 8/2016 | Suzuki | B60L 58/20 |
| 2017/0357669 A1* | 12/2017 | Offenhaeuser | B60W 40/068 |
| 2019/0047575 A1* | 2/2019 | Lellmann | G08G 1/096775 |
| 2019/0118822 A1* | 4/2019 | Hagenlocher | B60W 40/068 |
| 2020/0307606 A1* | 10/2020 | Lellmann | B60W 50/0097 |
| 2021/0188252 A1* | 6/2021 | Lu | B60W 40/12 |
| 2021/0213935 A1* | 7/2021 | Lu | B60C 23/04 |
| 2022/0203783 A1* | 6/2022 | Maeda | B60C 11/246 |

FOREIGN PATENT DOCUMENTS

| | | | | |
|---|---|---|---|---|
| EP | 3848259 A1 * | 7/2021 | | B60T 8/172 |
| JP | 2002-362345 A | 12/2002 | | |
| WO | WO-2007116123 A1 * | 10/2007 | | B60T 8/172 |

* cited by examiner

METHOD FOR DETERMINING STATE OF ROAD SURFACE

CROSS REFERENCE TO RELATED APPLICATIONS

This application claims a priority to Japanese Patent Application No. 2021-091815 filed on May 31, 2021, which is hereby incorporated by reference in its entirety.

FIELD OF INVENTION

The present invention relates to a determining method, device, and program for determining a state of a road surface on which a vehicle travels.

BACKGROUND

JP 2002-362345A has disclosed an apparatus for determining a state of a road surface on which a vehicle travels. In JP 2002-362345A, a linear regression coefficient K1 of a slip ratio relative to vehicle acceleration and a linear regression coefficient K2 of vehicle acceleration relative to a slip ratio are calculated from data of a slip ratio obtained from an average wheel speed of drive wheels and a vehicle speed, and vehicle acceleration. The data of a slip ratio and acceleration used in this processing is data acquired when the turning radius of the vehicle is greater than a predetermined value. In the case in which the correlation coefficient obtained by multiplying these coefficients is greater than or equal to a predetermined threshold value, the value of the regression coefficient K1 is updated, and whether or not the road surface is slippery is determined based on the value of the regression coefficient K1.

SUMMARY OF INVENTION

According to the apparatus disclosed in JP 2002-362345A, it is first necessary to store a regression coefficient in the case in which the turning radius of a vehicle is greater than a predetermined value and the above-mentioned correlation coefficient is greater than or equal to a predetermined value during travel of the vehicle. That is to say, according to the apparatus disclosed in JP 2002-362345A, it is not possible to acquire an appropriate regression coefficient K1 for determining a state of a road surface as long as a vehicle travels under the condition that the correlation coefficient does not reach the predetermined value. That is to say, if the state of a road surface on which a vehicle travels repeatedly changes from the start of the vehicle's travel and the data accordingly varies, the regression coefficient K1 for determining the state of the road surface cannot be acquired, and thus the state of the road surface may not be able to be determined.

It is an object of the present invention to provide a determining method, device, and program that make it possible to determine a state of a road surface without acquiring a threshold value of a parameter for the determination during travel of a vehicle.

A first aspect of the present invention is directed to a determining method for determining a state of a road surface on which a vehicle travels, including the following steps.

Sequentially acquiring a rotational speed of tires mounted on the vehicle

Sequentially acquiring a driving force of the vehicle

Calculating a slip ratio based on the sequentially acquired rotational speed of the tires Calculating a regression equation and a confidence interval width for a relationship between the slip ratio and the driving force, based on a large number of data sets of the slip ratio and the driving force in a predetermined zone Determining a state of the road surface on which the vehicle travels, based on the confidence interval width calculated for the predetermined zone A second aspect of the present invention is directed to the determining method according to the first aspect, wherein the calculating a confidence interval width includes calculating a confidence interval width for a plurality of vehicles in the predetermined zone. Furthermore, the determining a state of the road surface includes determining that the road surface is slippery in a case in which an average value of the confidence interval width calculated for the predetermined zone is at least a predetermined threshold value.

A third aspect of the present invention is directed to the determining method according to the first or second aspect, wherein the calculating a confidence interval width includes calculating a confidence interval width for a plurality of vehicles in the predetermined zone. Furthermore, the determining a state of the road surface includes determining that the road surface is slippery in a case in which a variance of the confidence interval width calculated for the predetermined zone is at least a predetermined threshold value.

A fourth aspect of the present invention is directed to the determining method according to any one of the first to third aspects, further including performing filtering for removing measurement errors of the slip ratio and the driving force, before the calculating a regression equation and a confidence interval width for a relationship between the slip ratio and the driving force.

A fifth aspect of the present invention is directed to a determining device for determining a state of a road surface on which a vehicle travels, including: a rotational speed acquiring portion, a driving force acquiring portion, a slip ratio calculating portion, a confidence interval width calculating portion, and a determining portion. The rotational speed acquiring portion sequentially acquires a rotational speed of tires mounted on the vehicle. The driving force acquiring portion sequentially acquires a driving force of the vehicle. The slip ratio calculating portion calculates a slip ratio based on the sequentially acquired rotational speed of the tires. The confidence interval width calculating portion calculates a regression equation and a confidence interval width representing a relationship between the slip ratio and the driving force, based on a large number of data sets of the slip ratio and the driving force in a predetermined zone. The determining portion determines a state of the road surface, based on the confidence interval width calculated for the predetermined zone.

A sixth aspect of the present invention is directed to a determining program for determining a state of a road surface on which a vehicle travels, causing a computer to execute the following steps.

Sequentially acquiring a rotational speed of tires mounted on the vehicle

Sequentially acquiring a driving force of the vehicle

Calculating a slip ratio based on the sequentially acquired rotational speed of the tires Calculating a regression equation and a confidence interval width for a relationship between the slip ratio and the driving force, based on a large number of data sets of the slip ratio and the driving force in a predetermined zone Determining a state of the road surface on which the vehicle travels, based on the confidence interval width calculated for the predetermined zone The regression analysis of a driving force and a slip ratio has been found to be stable on a non-slippery road surface and unstable on a slippery road surface. The present invention uses this property to determine a state of a road surface. Therefore, the state of a road surface can be determined even when data that enables a regression analysis to be stably performed cannot be acquired from the beginning of travel of a vehicle.

DETAILED DESCRIPTION OF THE PREFERRED EMBODIMENTS

Hereinafter, a determining device, method, and program according to an embodiment of the present invention will be described with reference to the drawings.

1. Configuration of Determining Apparatus

Figure 1:
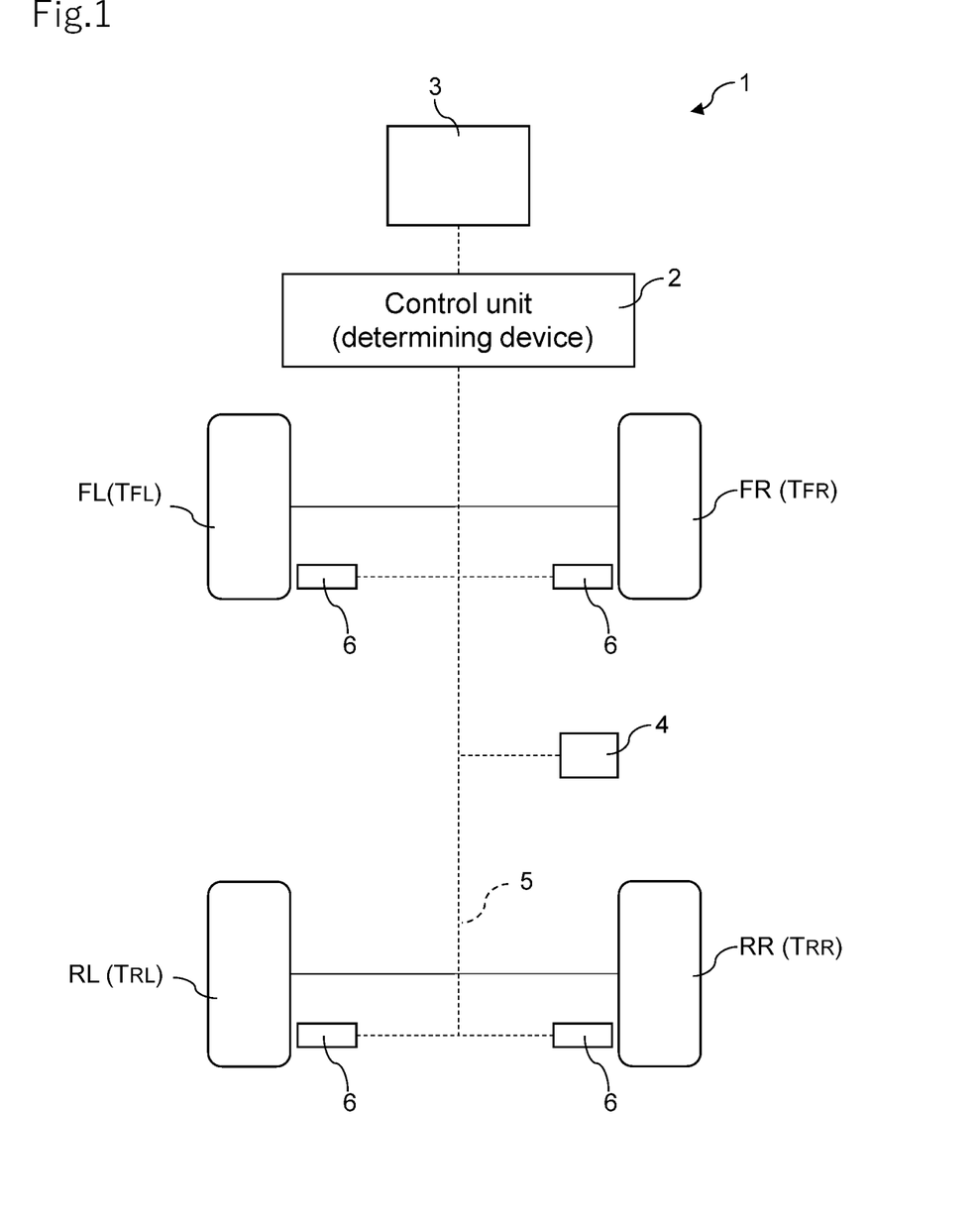
FIG. 1 is a schematic diagram showing a state in which a control unit serving as a determining device according to an embodiment is mounted in a vehicle.

FIG. 1 is a schematic diagram showing a state in which a control unit 2 serving as a determining device according to this embodiment is mounted in a vehicle 1. The vehicle 1 is a four-wheeled vehicle, and includes a front left wheel FL, a front right wheel FR, a rear left wheel RL, and a rear right wheel RR. Tires $T_{FL}$, $T_{FR}$, $T_{RL}$, and $T_{RR}$ are respectively attached to the wheels FL, FR, RL, and RR. The vehicle 1 according to this embodiment is a front-engine front-drive vehicle (FF vehicle), wherein the front tires $T_{FL}$ and $T_{FR}$ are tires on drive wheels, and the rear tires $T_{RL}$ and $T_{RR}$ are tires on idler wheels.

The control unit 2 calculates a slip ratio S indicating how likely the tires $T_{FL}$, $T_{FR}$, $T_{RL}$, and $T_{RR}$ are to slip during travel, based on information on the rotational speeds of the tires $T_{FL}$, $T_{FR}$, $T_{RL}$, and $T_{RR}$ during travel, and determines a state of a road surface on which the vehicle 1 travels based on a confidence interval width of the regression analysis of the slip ratio S and a driving force F. Note that the determination of the state of the road surface is a determination of whether the road has a non-slippery road surface or a slippery road surface for the tires $T_{FL}$, $T_{FR}$, $T_{RL}$, and $T_{RR}$. Examples of the non-slippery road surface include dry asphalt, and examples of the slippery road surface include frozen road surfaces, snow-covered road surfaces, and wet road surfaces. The information on the state of the road surface can be used in various applications, such as various types of control for controlling the traveling of vehicles, or the generation of a road map regarding the state of road surfaces, for example. Examples of the various types of control for controlling the traveling of vehicles include issuing an alarm to drivers regarding hydroplaning or the like, controlling braking systems, and controlling distances between vehicles.

Wheel speed sensors 6 are respectively attached to the tires $T_{FL}$, $T_{FR}$, $T_{RL}$, and $T_{RR}$ (more specifically, the wheels FL, FR, RL, and RR) of the vehicle 1, and respectively detect rotational speeds (i.e., wheel speeds) V1 to V4 of the tires mounted on the wheels to which the wheel speed sensors 6 are attached. V1 to V4 are respectively the rotational speeds of the tires $T_{FL}$, $T_{FR}$, $T_{RL}$, and $T_{RR}$. As long as the wheel speeds of the wheels FL, FR, RL, and RR during travel can be detected, there is no limitation on the wheel speed sensors 6. For example, they may be sensors that measure wheel speed from output signals of electromagnetic pickups, or sensors that measure wheel speed from voltages when electricity is generated through rotation, such as a dynamo. Also, as long as the rotational speed can be detected, there is no particular limitation on the attachment positions of the wheel speed sensors 6, and they may be selected as appropriate according to the type of sensor. The wheel speed sensors 6 are connected to the control unit 2 via the communication line 5. The information of the rotational speeds V1 to V4 detected by the wheel speed sensors 6 is transmitted to the control unit 2 in real-time.

A wheel torque sensor 4 (which may be hereinafter simply referred to as a torque sensor 4) that detects a wheel torque WT of the vehicle 1 is attached to the vehicle 1. As long as the wheel torque WT of the vehicle 1 can be detected, there is no particular limitation on the structure and the attachment position of the wheel torque sensor 4. The wheel torque sensor 4 is connected to the control unit 2 via the communication line 5. The information of the wheel torque WT detected by the wheel torque sensor 4 is transmitted to the control unit 2 in real-time, as with the information of the rotational speeds V1 to V4.

Figure 2:
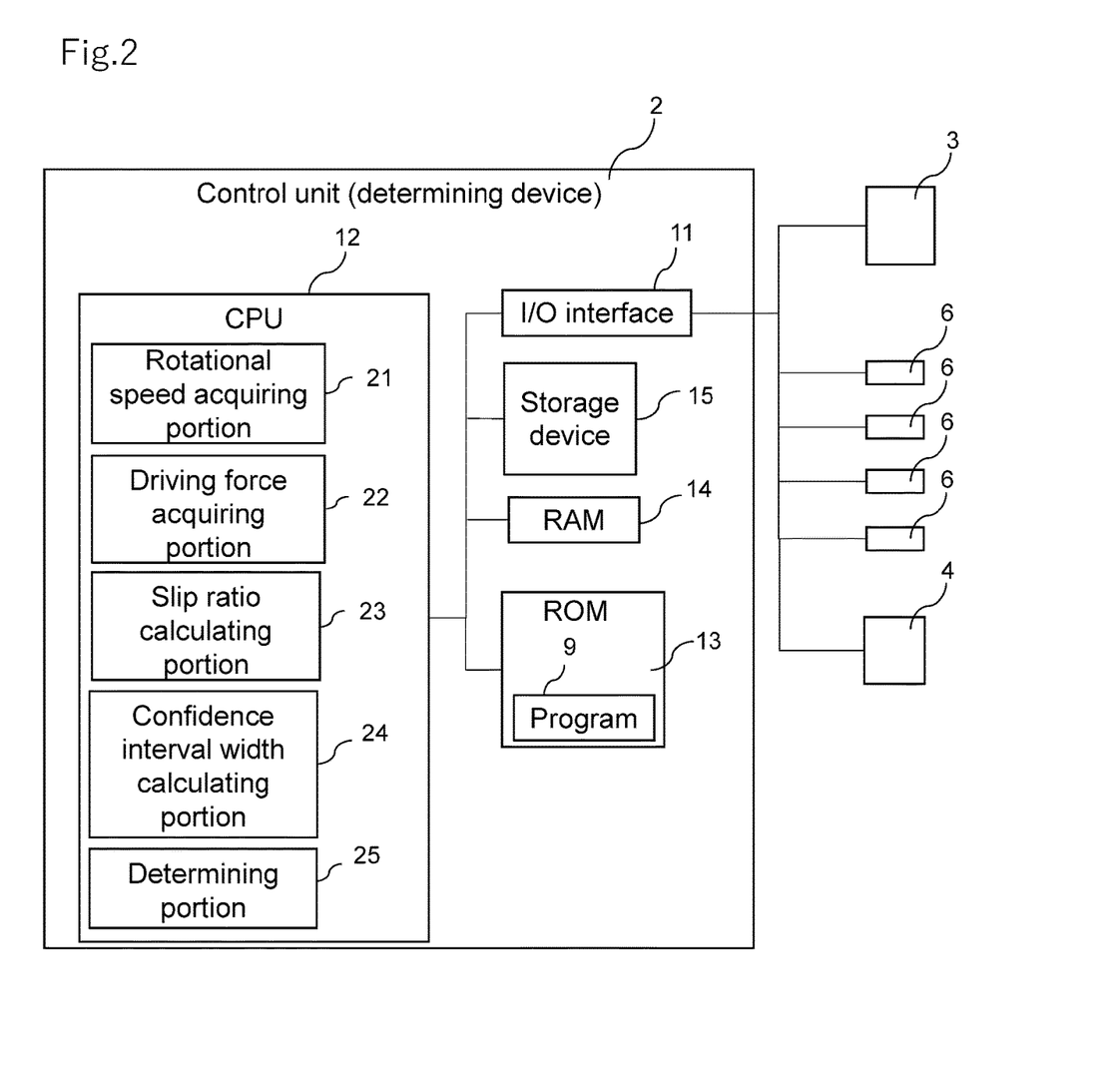
FIG. 2 is a block diagram showing the electrical configuration of the control unit according to this embodiment.

FIG. 2 is a block diagram showing the electrical configuration of the control unit 2. The control unit 2 is a computer mounted in the vehicle 1, and includes an I/O interface 11, a CPU 12, a ROM 13, a RAM 14, and a nonvolatile and rewritable storage device 15, as shown in FIG. 2. The I/O interface 11 is a communication device that communicates with external devices such as the wheel speed sensors 6, a wheel torque sensor 4, and an indicator 3. The ROM 13 stores a program 9 for controlling operations of parts of the vehicle 1. Typically, the program 9 is loaded into the ROM 13 from a storage medium such as a CD-ROM. The CPU 12 reads the program 9 from the ROM 13 and executes it, thereby virtually operating as a rotational speed acquiring portion 21, a driving force acquiring portion 22, a slip ratio calculating portion 23, a confidence interval width calculating portion 24, and a determining portion 25. Details of the operations of the portions 21 to 25 will be described later. The storage device 15 is constituted by a hard disk, a flash memory, or the like. Note that the program 9 may be stored in the storage device 15, rather than the ROM 13. The RAM 14 and the storage device 15 are used as appropriate in calculation of the CPU 12.

The indicator 3 can output various types of information including an alarm to a user (mainly a driver), and may be realized in any form, such as a liquid crystal display, a liquid crystal monitor, a plasma display, or an organic EL display. The attachment position of the indicator 3 may be selected as appropriate, but the indicator is preferably provided at a position at which it can be readily recognized by a driver, such as a position on an instrument panel. In the case in which the control unit 2 is connected to a car navigation system, a car navigation monitor can also be used as the indicator 3. When a monitor is used as the indicator 3, the alarm may be an icon and/or text information that is displayed on the monitor.

2. Processing for Determining State of Road Surface

Hereinafter, determination processing that determines a state of a road surface on which the vehicle 1 travels will be described based on a regression analysis of the slip ratio S of the tires $T_{FL}$, $T_{FR}$, $T_{RL}$, and $T_{RR}$ and the driving force F of the vehicle 1 during travel with reference to FIG. 3. The determination processing is performed while power is supplied to the electric system of the vehicle 1.

In step S1, the rotational speed acquiring portion 21 acquires rotational speeds V1 to V4 of the tires $T_{FL}$, $T_{FR}$, $T_{RL}$, and $T_{RR}$ during travel. The rotational speed acquiring portion 21 receives output signals from the wheel speed sensors 6 in a predetermined sampling period, and converts them into the rotational speeds V1 to V4.

In step S2, the driving force acquiring portion 22 acquires a driving force F of the vehicle 1. The driving force acquiring portion 22 receives an output signal from the wheel torque sensor 4 in a predetermined sampling period, and converts it into the wheel torque WT.

In step S3, the slip ratio calculating portion 23 determines whether or not data of the rotational speeds V1 to V4 and the wheel torque WT is valid for determining a state of a road surface. This is a step of determining that data acquired in the case in which the data may have an undesirable influence on the level of precision in determining a state of a road surface is not valid, and determining that data acquired in the other cases is valid. The case in which data may have an undesirable influence on the level of precision in determining a state of a road surface may be, for example, the case in which the brakes of the vehicle 1 are activated. The slip ratio calculating portion 23 can determine whether or not the brakes are activated based on an output signal from the brake control system, for example. If the slip ratio calculating portion 23 determines that the data is valid, the procedure advances to step S4. On the other hand, if the slip ratio calculating portion 23 determines that the data is not valid, the previous data of the rotational speeds V1 to V4 and the wheel torque WT is discarded, and the procedure returns to step S1.

In step S4, the driving force acquiring portion 22 calculates a driving force F of the vehicle 1 from the converted wheel torque WT. The driving force F can be calculated by dividing the wheel torque WT by the radius of the tires $T_{FL}$, $T_{FR}$, $T_{RL}$, and $T_{RR}$, for example.

In following step S5, the slip ratio calculating portion 23 calculates a slip ratio S based on the rotational speeds V1 to V4. In this embodiment, the slip ratio S is calculated by (speeds of drive wheels−vehicle speed)/vehicle speed, where the speeds of the idler wheels are used as the vehicle speed. In this embodiment, the slip ratio S is defined as follows.

$$S=\{(V1+V2)-(V3+V4)\}/(V3+V4)$$

At a time that is after steps S4 and S5 are performed and before the following step is performed, the driving force F calculated in step S4 and the slip ratio S calculated in step S5 may be subjected to filtering for removing measurement errors.

The data of the rotational speeds V1 to V4, the wheel torque WT, the slip ratio S, and driving force F, which are acquired in successively-performed steps S1 to S5, are treated as a data set acquired at the same time or substantially the same time, and stored in the RAM 14 or the storage device 15. In step S6, the confidence interval width calculating portion 24 determines whether or not a data set for a predetermined zone has been stored in the RAM 14 or the storage device 15. The predetermined zone is a zone defined at each predetermined distance L, and the confidence interval width calculating portion 24 determines whether or not a data set corresponding to travel of the vehicle 1 by the distance L has been stored in the RAM 14 or the storage device 15. The distance by which the vehicle 1 travels may be derived from the rotational speeds V3 and V4, or from positioning signals of a global positioning system (GPS) or the like received by a car navigation system or the like mounted on the vehicle 1.

If it is determined that the vehicle 1 has further traveled by the distance L since the last time a data set for the predetermined zone was accumulated, the confidence interval width calculating portion 24 determines that the latest data set for the predetermined zone has been stored in the RAM 14 or the storage device 15. In this case, the procedure advances to step S7. On the other hand, if it is determined that the distance by which the vehicle 1 travels has not reached the distance L since the last time a data set for the predetermined zone was accumulated, the confidence interval width calculating portion 24 determines that the latest data set for the predetermined zone stored in the RAM 14 or the storage device 15 is insufficient, and the procedure returns to step S1.

In step S7, the confidence interval width calculating portion 24 calculates a regression equation of the driving force F and the slip ratio S, and a confidence interval width Y, based on a large number of data sets of the driving force F and the slip ratio S in a predetermined zone. The large number of data sets of the driving force F and the slip ratio S are a large number of data sets of the slip ratio S and the driving force F at the present time when the state of a road surface is determined or therebefore. Hereinafter, the number of data sets for the predetermined zone is expressed as N. The confidence interval width calculating portion 24 first calculates regression coefficients a and b for specifying a regression equation of data sets of the driving force F and the slip ratio S for the predetermined zone, assuming that the driving force F and the slip ratio S are in a linear relationship represented by the following equation (1). In the equation, a is a slope of the slip ratio S relative to the driving force F, and b is an intercept of the slip ratio S relative to the driving force F. The regression coefficients a and b can be calculated by a method such as the least squares method, for example.

$$S=aF+b \quad (1)$$

Figure 4A:
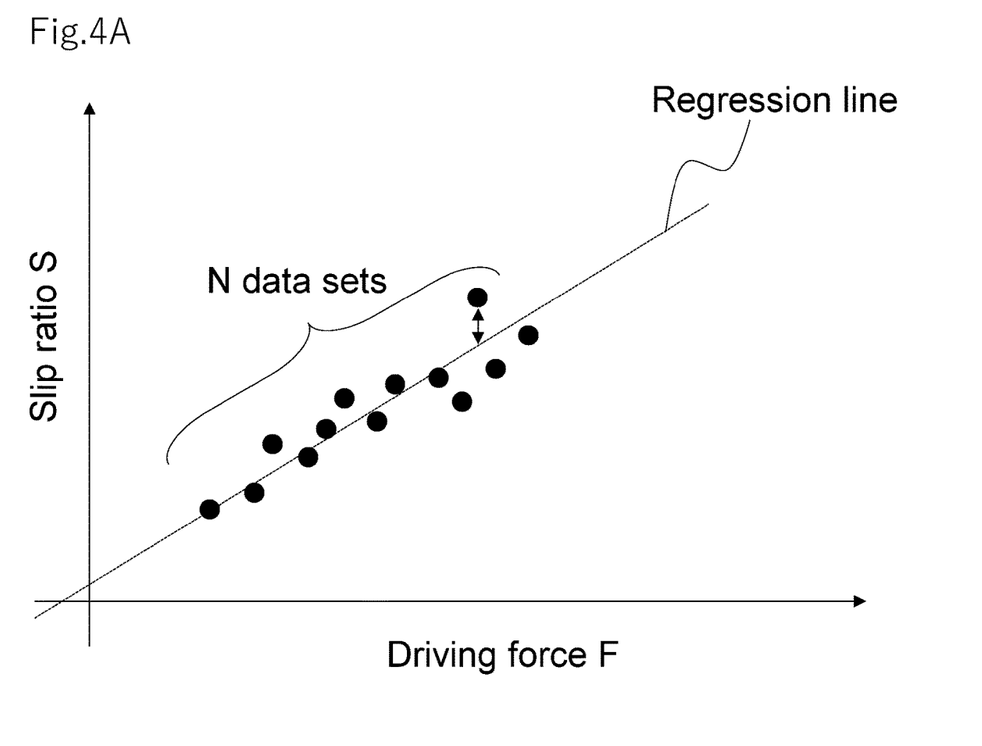
FIG. 4A is a graph illustrating calculation processing of a confidence interval width.
Figure 4B:
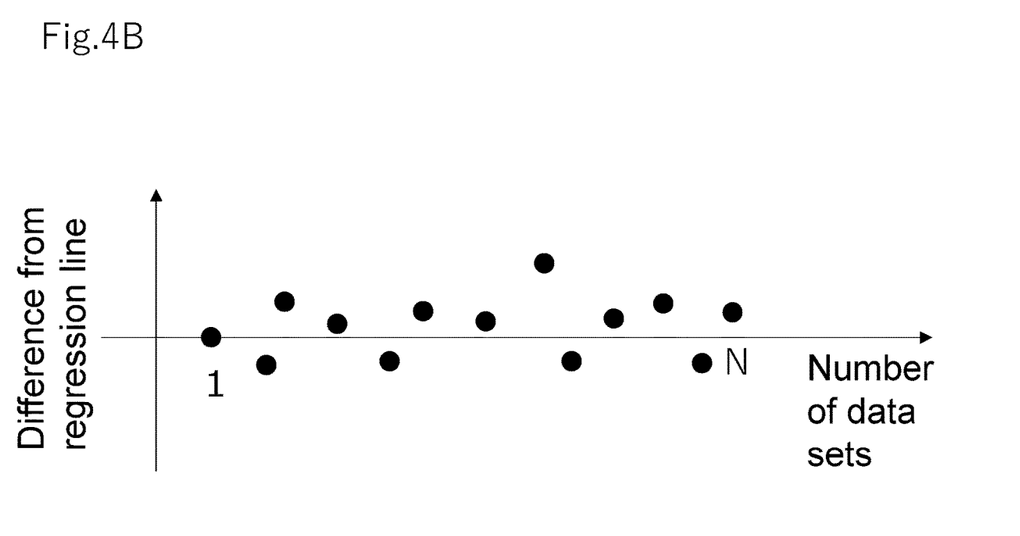
FIG. 4B is a graph illustrating calculation processing of a confidence interval width.

Furthermore, the confidence interval width calculating portion 24 calculates the confidence interval width Y according to the following procedure. The confidence interval width Y in this embodiment represents the width of the confidence interval for the distribution of a residual of the obtained regression equation, and is used as an indicator reflecting the stability of the regression analysis, as described below. First, the driving force $F_n$ (n=1, 2, . . . , N) contained in the N data sets are sequentially substituted for the equation (1) above, so that prediction values ($aF_n+b$) of the slip ratio S relative to the driving force $F_n$ are sequentially calculated (see FIG. 4A). Next, for the slip ratio $S_n$ contained in the N data sets, differences between calculated N slip ratios S and prediction values, that is, residuals $e_n$ (n=1, 2, . . . , N) are respectively calculated (see FIG. 4B). The residuals $e_n$ can be calculated by $\{S_n-(aF_n+b)\}$ and are assumed to follow a normal distribution. Next, a variance $s^2$ of the residuals $e_n$ is calculated according to the following equation. In the equation, $e_{ave}$ represents an average of the residuals $e_n$.

$$s^2 = \frac{1}{N}\sum_{n=1}^{N}(e_n - e_{ave})^2$$

Then, "$t_{\alpha/2}$" of the t-distribution of the degrees of freedom (N−1) is acquired. Note that t/2 is a value at which the upper probability in the t-distribution of the degrees of freedom (N−1) is α/2, and can be acquired from a known t-distribution table. The t-distribution table for this purpose can be stored in the RAM 14 or the storage device 15 in advance. Then, the lower limit $e_{min}$ and the upper limit $e_{max}$, which define the α % confidence interval, are calculated according to the following equation based on $t_{\alpha/2}$.

$$e_{min} = e_{ave} - t_{\alpha/2} \times \sqrt{\frac{s^2}{N}}, \quad e_{max} = e_{ave} + t_{\alpha/2} \times \sqrt{\frac{s^2}{N}}$$

Since the confidence width Y is the width of the confidence interval, it can be calculated by $(e_{max}-e_{min})$. If the number of data sets to be used for one regression analysis in the same zone is determined in advance, and $t_{\alpha/2}$ is stored as a constant in advance in the RAM 14 or the storage device 15, the confidence interval width Y can be directly calculated from the number of data sets, the average $e_{ave}$ of residuals, the variance $s^2$, and $t_{\alpha/2}$. Furthermore, α (0.99, 0.95, etc.) can be selected as appropriate and set in advance.

The reason as to why the confidence interval width calculating portion 24 calculates the confidence interval width Y is as follows. When the vehicle 1 travels on a road surface that has a high coefficient of friction and is unlikely to cause the tires $T_{FL}$, $T_{FR}$, $T_{RL}$, and $T_{RR}$ to slip (such a road surface is also called a high μ road), the variation of the slip ratio S with respect to the driving force F is small. Accordingly, the regression analysis based on data sets of the driving force F and the slip ratio S is stable, and the confidence interval width Y is relatively small. On the other hand, when the vehicle 1 travels on a road surface that has a low coefficient of friction and is likely to cause the tires $T_{FL}$, $T_{FR}$, $T_{RL}$, and $T_{RR}$ to slip (such a road surface is also called a low μ road), the variation of the slip ratio S with respect to the driving force F is large. Accordingly, the regression analysis based on data sets of the driving force F and the slip ratio S is not stable, and the confidence interval width Y is relatively large. The experiment described below in the example confirmed the above, and it was found that a clear difference appears in the confidence interval width Y between a high μ road and a low μ road. Accordingly, it is easy to set the threshold value for determining the state of a road surface and the level of precision in the determination is expected to be improved.

Incidentally, in order to accurately calculate the regression coefficients in the equation (1), it is desirable that the variation of the data sets of the slip ratio S and the driving force F is at least a certain value. However, for example, in a period during which the driving force F does not change so much, such as a period during which the vehicle is traveling at a constant speed on a descent, there is not so much variation of the data sets. In step S8, the confidence interval width calculating portion 24 determines whether or not the variation of the driving force F contained in data sets in a predetermined zone is at least a certain value. In other words, the confidence interval width calculating portion 24 determines whether or not a large number of data sets of the driving force F and the slip ratio S for the predetermined zone are suited to calculate the confidence interval width Y. In this embodiment, the width and the variance of a large number of values of the driving force F acquired in a period during which the vehicle 1 travels for the predetermined distance L are calculated, and, if they are both at least predetermined threshold values respectively, it is determined that the variation is at least the certain value, and the procedure advances to step S9.

On the other hand, if at least one of the width and the variance of the large number of values of the driving force F is smaller than the corresponding predetermined threshold value, it is determined that the variation is less than the certain value, and the data sets of the driving force F acquired in that zone and the slip ratio S corresponding to the driving force F are discarded. The data sets of the wheel torque WT used to calculate the driving force F and the rotational speeds V1 to V4 used to calculate the slip ratio S may be also discarded, and erased from the RAM 14 or the storage device 15. Subsequently, the procedure returns to step S1.

The determination in step S8 above may be performed before step S7 rather than after step S7. That is to say, there is no particular limitation on the time to determine whether or not the variation of the driving force F is at least a certain value, as long as it is after data of the driving force F in the predetermined zone is acquired, and whether or not the variation of the driving force F is at least a certain value may be determined before the regression coefficients a and b are calculated.

In step S9, the determining portion 25 compares the confidence interval width Y calculated in step S8 and a predetermined threshold value. If the confidence interval width Y is at least the predetermined threshold value, the procedure advances to step S10, and the determining portion 25 determines that the road surface is a slippery road surface. The determining portion 25 may be configured to, when the procedure advances to step S10, issue an alarm signal and cause the indicator 3 to display an alarm indicating that the road surface is slippery. On the other hand, if the confidence interval width Y is less than the predetermined threshold value, the procedure advances to step S11, and it is determined that the road surface is a non-slippery road surface. The predetermined threshold value in step S9 may be a value calculated in advance through an experiment or simulation and stored in the storage device 15 or the ROM 13.

After step S10 or S11, the procedure advances to step S12, and the determining portion 25 determines whether or not the vehicle 1 has stopped traveling. If it is determined that the vehicle 1 has not stopped traveling and is continuing to travel, the procedure returns to step S1, and a similar procedure is repeated. On the other hand, if it is determined that the vehicle 1 has stopped traveling, the procedure is ended.

3. Modified Examples

Although an embodiment of the present invention has been described thus far, the present invention is not limited to the foregoing embodiment, and various modifications may be made without departing from the gist of the present invention. For example, the following modifications may be made. The gist of the following modifications may be combined as appropriate.

3-1

The function of determining the state of the road surface using a confidence interval width of a regression analysis of the slip ratio S and the driving force F according to the foregoing embodiment can be applied also to rear-drive vehicles and four-wheel drive vehicles. Moreover, this function is not limited to four-wheeled vehicles, and can be applied also to three-wheeled vehicles, six-wheeled vehicles, and the like as appropriate.

3-2

The method for acquiring the driving force F is not limited to that described in the foregoing embodiment. For example, if an acceleration sensor is attached to the vehicle 1, an output value of the acceleration sensor may be used as the driving force F. Furthermore, the driving force F may be derived from the engine torque and the engine speed obtained from the control unit of the engine of the vehicle 1, or from the rotational speeds V1 to V4 of the tires.

3-3

The method for calculating the slip ratio S is not limited to that described in the foregoing embodiment. For example, if the slip ratio is defined as: slip ratio S=(speeds of drive wheels−vehicle speed)/vehicle speed, it is also possible to calculate a slip ratio S while using, as the vehicle speed, a value obtained by integrating an acceleration a acquired by an acceleration sensor. Furthermore, for example, the vehicle speed may be acquired from a GPS satellite navigation system or the like communicably connected to the vehicle 1.

3-4

Figure 3:
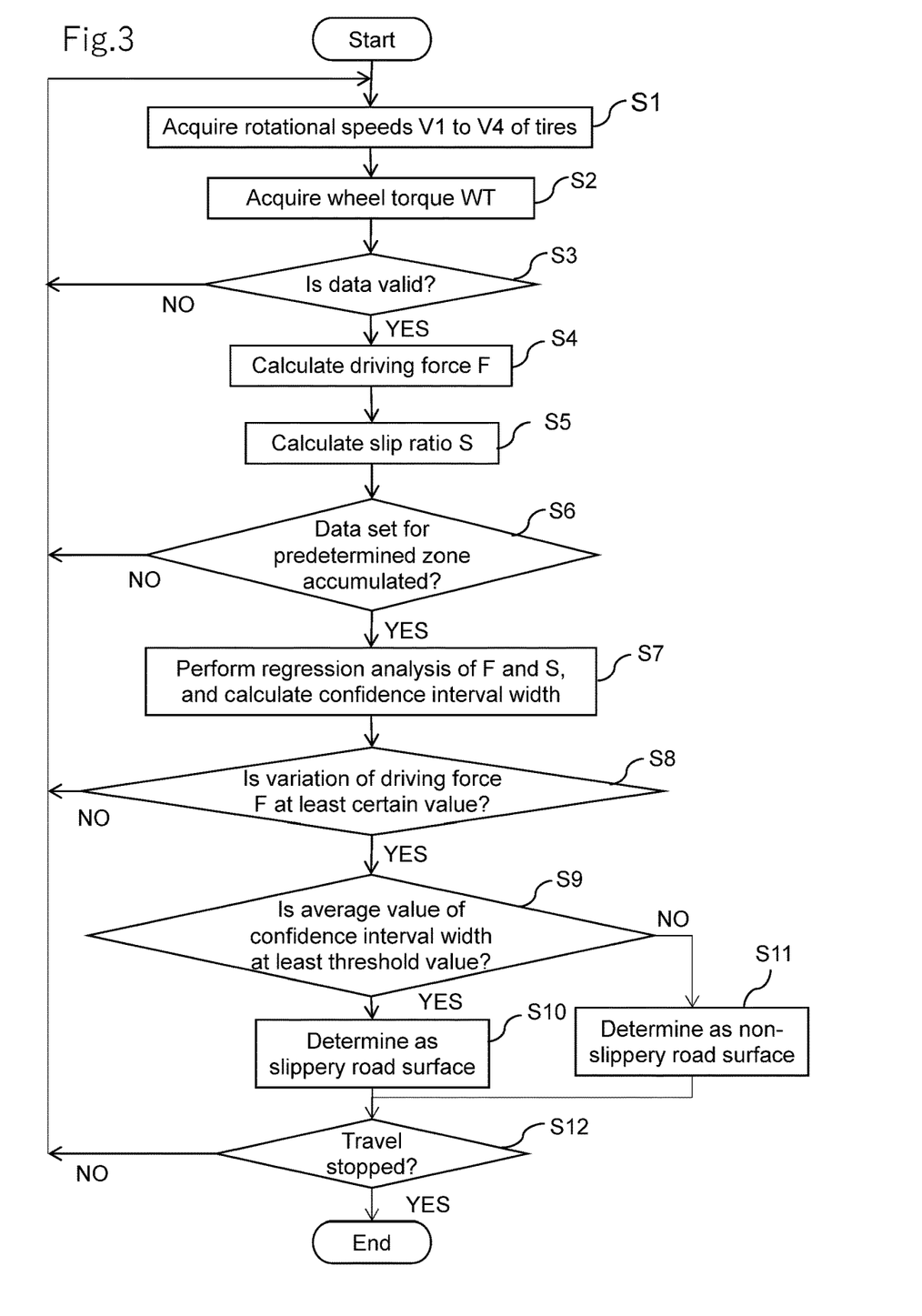
FIG. 3 is a flowchart showing the flow of processing for determining a state of a road surface according to this embodiment.

The order in which steps S1 to S12 in FIG. 3 are performed is not limited to that described in the foregoing embodiment, and may be partially changed. For example, step S1 may be performed after step S2, and steps S1 and S2 may be simultaneously performed in parallel. In a similar manner, step S4 may be performed after step S5, and steps S4 and S5 may be simultaneously performed in parallel. In a similar manner, step S7 may be performed after step S8.

3-5

The confidence interval width Y calculated in step S7 is not limited to that described in the foregoing embodiment. The confidence interval width Y may be an indicator that reflects the stability of the regression analysis and becomes smaller in accordance with an increase in the stability of the regression analysis and larger in accordance with a decrease in the stability of the regression analysis, and may be, for example, the width of a confidence interval and the width of a prediction interval of a regression line for a predetermined driving force F. The width of a confidence interval is the width of the $\alpha$ % confidence interval, and can be calculated according to the following equation. Note that a (e.g., 0.95, etc.) can be selected as appropriate.

$$t(N-2, \alpha)\sqrt{\left(\frac{1}{N} + \frac{(F-F_m)^2}{\Sigma_{n=1}^{N}(F_n-F_m)^2}\right)V_e}$$

where $F_m$ is an average of the driving force $F_n$, and the variance $V_e$ is calculated according to the following equation.

$$V_e = \frac{\Sigma_{n=1}^{N} e_n^2}{N-2}$$

Furthermore, the width of the $\alpha$ % prediction interval for the predetermined driving force F can be calculated according to the following equation. Note that a (e.g., 0.95, etc.) can be selected as appropriate.

$$t(N-2, \alpha)\sqrt{\left(1 + \frac{1}{N} + \frac{(F-F_m)^2}{\Sigma_{n=1}^{N}(F_n-F_m)^2}\right)V_e}$$

As described above, on high $\mu$ roads, the variation of the slip ratio S with respect to the driving force F is small, and the regression analysis based on data sets of the driving force F and the slip ratio S is stable. Accordingly, on high $\mu$ roads, the width of the confidence interval and the width of the prediction interval in the regression interval tend to be small. On the other hand, on low $\mu$ roads, the variation of the slip ratio S with respect to the driving force F is large, and the regression analysis based on data sets of the driving force F and the slip ratio S is unstable. Accordingly, on low $\mu$ roads, the width of the confidence interval and the width of the prediction interval in the regression interval tend to be large. Thus, the width of the confidence interval and the width of the prediction interval in the regression interval can be calculated as the confidence interval width Y to determine whether the road surface is a high $\mu$ road or a low $\mu$ road.

Moreover, the confidence interval width Y may be the width of the confidence interval for at least one of the probability distributions followed by the estimators of the regression coefficients a and b.

3-6

The determination of the road surface may be performed not only by comparing the confidence interval width Y with a predetermined threshold value, but also by comparing the variance or the average value of the confidence interval width Y with a predetermined threshold value. In this case, the confidence interval width calculating portion 24 may be configured to calculate at least one of the variance and the average value of the confidence width Y calculated for a plurality of predetermined driving forces F. Furthermore, the determining portion 25 may be configured to determine a state of a road surface by comparing at least one of the variance and the average value of the calculated confidence interval width Y with a predetermined threshold value stored in advance in the storage device 15 or the ROM 13. If the road surface is a low $\mu$ road, the variance and the average value of the confidence interval width Y are at least predetermined threshold values respectively, and, if the road surface is a high $\mu$ road, the variance and the average value of the confidence interval width Y are less than the predetermined threshold values respectively.

3-7

Figure 5:
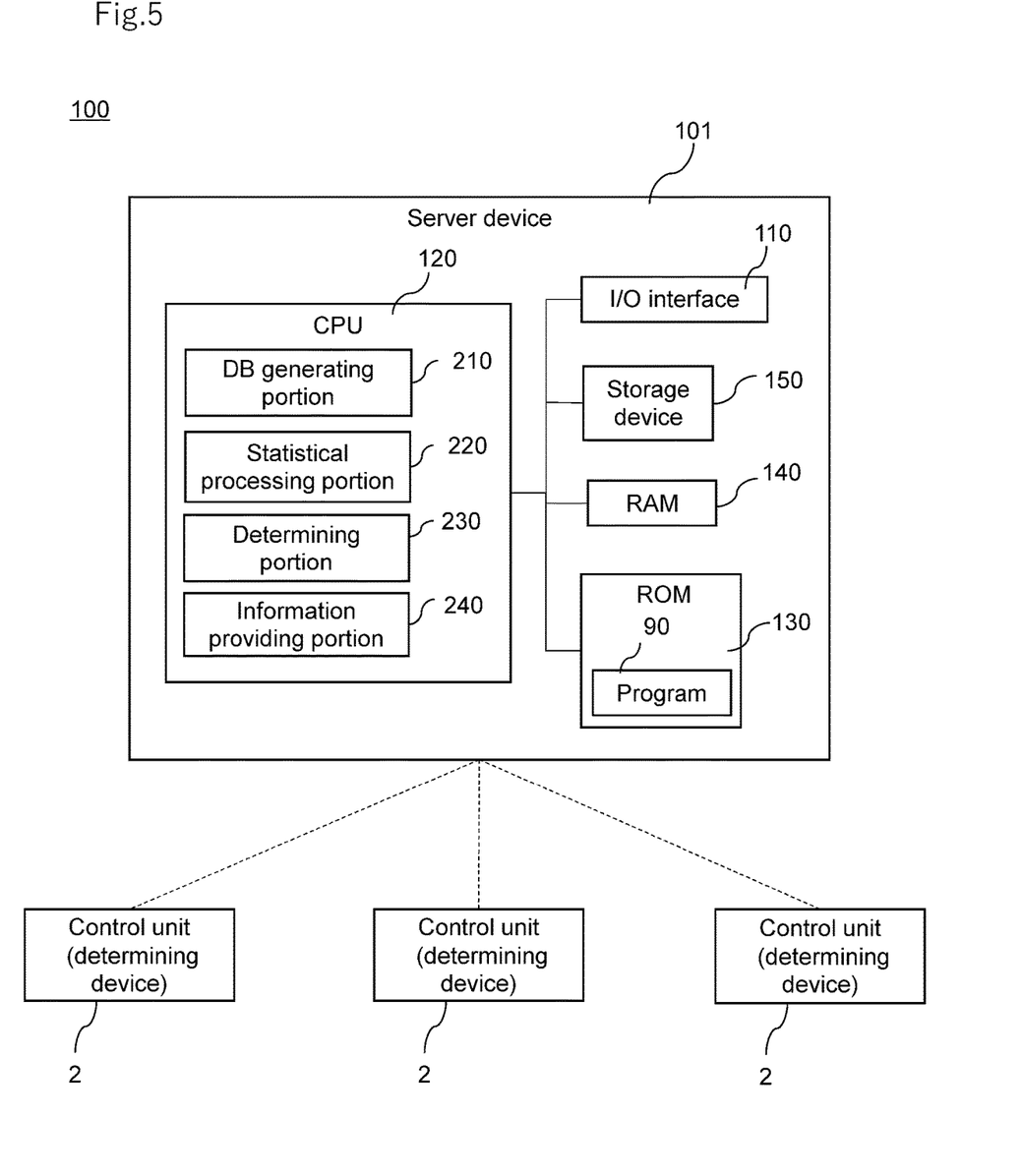
FIG. 5 is a block diagram showing the electrical configuration of a system for determining a state of a road surface according to a modified example.

The method according to the foregoing embodiment is performed by a single determining device (control unit) 2. However, the method according to the foregoing embodiment may be performed by a system 100 including a plurality of determining devices 2 respectively mounted in a plurality of vehicles 1 and a server device 101. FIG. 5 is a block diagram showing the electrical configuration of the system 100 for determining a state of a road surface. The determining devices 2 are each communicably connected to a GPS satellite positioning system or the like, and also to the server device 101. The server device 101 is constituted by a general-purpose computer as hardware, for example, and includes an I/O interface 110, a CPU 120, a ROM 130, a RAM 140, and a nonvolatile and rewritable storage device 150. The I/O interface 110 is a communication device that communicates with external devices such as the determining devices 2 and the like. The ROM 130 stores a program 90 for providing the determining devices 2 with a cloud service. The CPU 120 reads the program 90 from the ROM 130 and executes it, thereby virtually operating as a database (DB) generating portion 210, a statistical processing portion 220, a determining portion 230, and an information providing portion 240.

In the system 100, the determining devices 2 may be configured to transmit the confidence interval width Y calculated by the method according to the foregoing embodiment, together with the positioning signal of the satellite positioning system, to the server device 101. The DB generating portion 210 of the server device 101 stores the confidence interval width Y transmitted from each determining device 2 in the storage device 150 or the RAM 140. Road map data is stored in advance in the storage device 150. The DB generating portion 210 generates a database by associating the confidence width Y with zones on the road map based on positioning signals of the satellite positioning system transmitted from the determining devices 2.

When a predetermined number of data sets are accumulated in the database, the statistical processing portion 220 of the server device 101 calculates at least one of the variance and the average value of the confidence interval width Y at the same zone on the road map. The determining portion 230 compares the variance of the confidence interval width Y with a predetermined threshold value, and determines that the zone has a slippery road surface in the case in which the variance is at least the predetermined threshold value and determines that the zone has a non-slippery road surface in the case in which the variance is less than the predetermined threshold value. Alternatively, the determining portion 230 compares the average value of the confidence interval width Y with a predetermined threshold value, and determines that the zone has a slippery road surface in the case in which the average value is at least the predetermined threshold value and determines that the zone has a non-slippery road surface in the case in which the average value is less than the predetermined threshold value. The predetermined threshold value may be a value determined in advance through an experiment using one or a plurality of types of vehicles 1 and stored in the ROM 130 or the storage device 150. Results of the determination performed by the determining portion 230 may be associated with zones on the road map and stored in or overwritten to the storage device 150.

It seems that the tendency that the regression analysis of the driving force F and the slip ratio S is stable on a high μ road but is unstable on a low μ road also applies to different types of vehicles 1 and tires mounted thereon. Thus, it is possible to perform a more versatile road surface determination by evaluating at least one of the variance and the average value of the confidence interval width Y of a plurality of vehicles 1 at the same zone. Furthermore, it is also possible for the server device 101 to monitor changes in the state of the road surface over time in a predetermined zone, by updating a result of the determination performed by the determining portion 230 associated with the zone on the road map, at predetermined time intervals.

The information providing portion 240 can provide each determining device 2 with information indicating a state of a road surface in a zone in which the vehicle 1 including the determining device 2 travels, or its nearby zone. The determining device 2 may be configured to, in the case in which the determining device is unable to determine the state of a road surface by itself for some reason, access the server device 101 and acquire information on the state of the road surface in the zone in which the vehicle is currently traveling. Examples of such a case include the case in which valid data of the rotational speeds V1 to V4 or the wheel torque WT cannot be acquired for a certain period of time or more, the case in which data sets for a predetermined zone have not been sufficiently accumulated, the case in which the variation of the acquired driving force F is not sufficient, and the like. Thus, in the system 100, even in the case in which each determining device 2 cannot determine a state of a road surface by itself, it is possible to seamlessly acquire determination results of a state of a road surface, using information accumulated in the server device 101.

EXAMPLES

Experiment

A vehicle was driven back and forth on a test course with a mixture of non-slippery and slippery road surfaces, and the confidence interval width was calculated for each 50 m zone according to the method of the foregoing embodiment. The vehicle was an RX200t and the tires fitted to the vehicle were 235/55R20 DUNLOP SPORT MAXX 050. The test course (owned by Japan Automobile Research Institute) was a substantially flat straight road constituted by a dry asphalt zone (a high μ road) from the travel starting point (0 m) to 850 m, an artificial low μ road zone from 850 to 1050 m, and a dry asphalt zone from 1050 to 1350 m. The vehicle made four round trips around the test course at various vehicle speeds, turning around at 0 m and 1350 m.

Results

Figure 6:
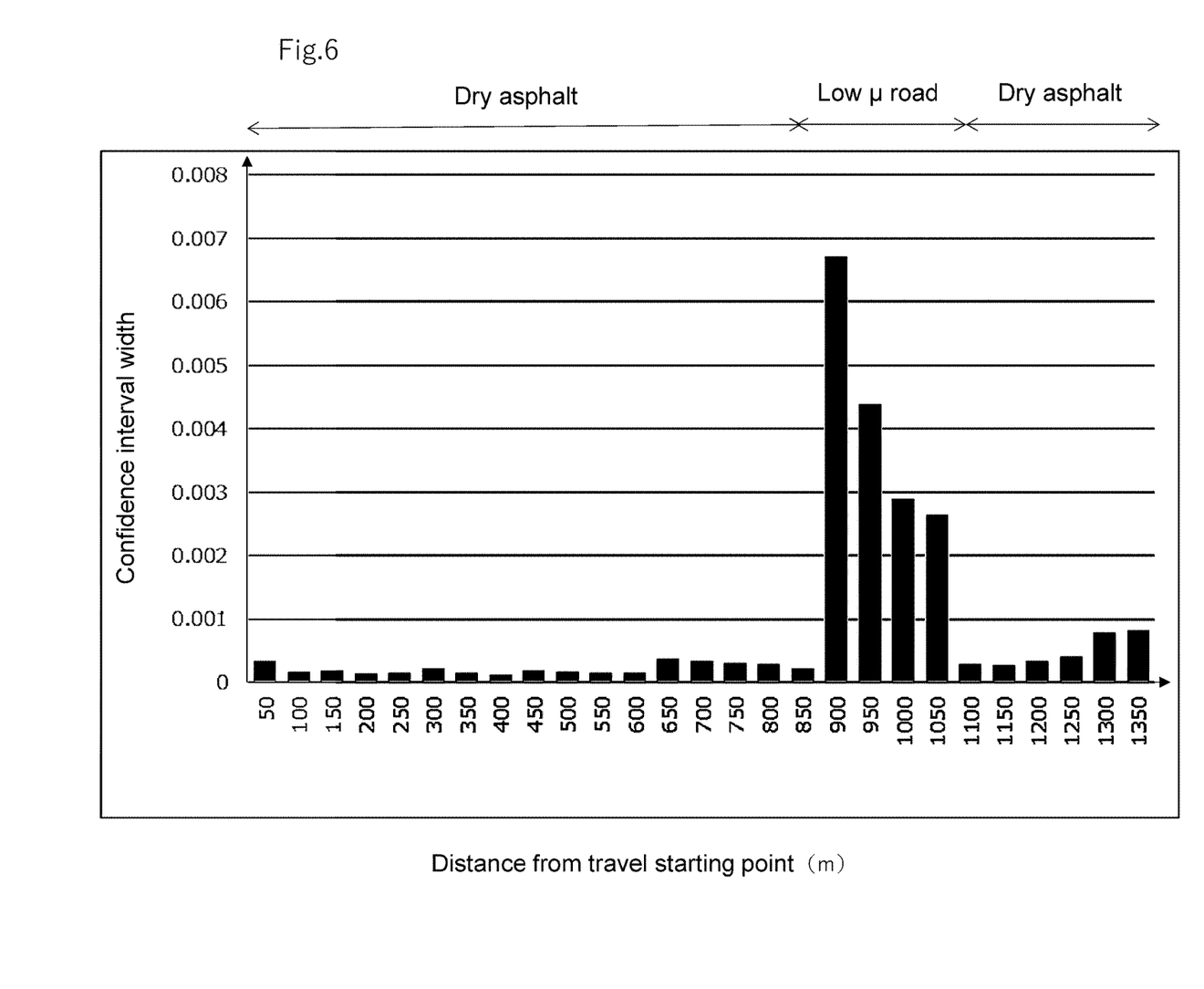
FIG. 6 is a graph illustrating results of an experiment.

FIG. 6 is a graph showing the results. In the graph, the horizontal axis indicates the distance from the travel starting point, and the vertical axis indicates the average value of the confidence interval width for the four round trips in each zone. As can be seen from the graph, the artificial low μ road zone (850 to 1050 m) has a large average value of the confidence interval width, the dry asphalt zones (0 to 850 m and 1050 to 1350 m) have a small average value of the confidence interval width, and these types of zones can be clearly distinguished from each other. This indicates that the method for determining a state of a road surface using the confidence interval width is effective for the regression analysis of the slip ratio S and the driving force F.

DESCRIPTION OF REFERENCE NUMERALS

1 Vehicle
2 Control unit (determining device)
3 Indicator
4 Wheel torque sensor
6 Wheel speed sensor
9 Program
21 Rotational speed acquiring portion
22 Driving force acquiring portion
23 Slip ratio calculating portion
24 Confidence interval width calculating portion
25 Determining portion
FL Front left wheel
FR Front right wheel
RL Rear left wheel
RR Rear right wheel
V1 to V4 Rotational speed of tire

What is claimed is:

1. A determining method for determining a state of a road surface on which a vehicle travels, comprising:
sequentially acquiring a rotational speed of tires mounted on the vehicle;
sequentially acquiring a driving force of the vehicle;
calculating a slip ratio based on the sequentially acquired rotational speed of the tires;
calculating a regression equation and a confidence interval width for a relationship between the slip ratio and the driving force, based on a large number of data sets of the slip ratio and the driving force in a predetermined zone; and
determining a state of the road surface on which the vehicle travels, based on the confidence interval width calculated for the predetermined zone.

2. The determining method according to claim 1,
wherein the calculating a confidence interval width includes calculating a confidence interval width for a plurality of vehicles in the predetermined zone, and
the determining a state of the road surface includes determining that the road surface is slippery in a case in which an average value of the confidence interval width calculated for the predetermined zone is at least a predetermined threshold value.

3. The determining method according to claim 1,
wherein the calculating a confidence interval width includes calculating a confidence interval width for a plurality of vehicles in the predetermined zone, and
the determining a state of the road surface includes determining that the road surface is slippery in a case in which a variance of the confidence interval width calculated for the predetermined zone is at least a predetermined threshold value.

4. The determining method according to claim 2,
wherein the calculating a confidence interval width includes calculating a confidence interval width for a plurality of vehicles in the predetermined zone, and
the determining a state of the road surface includes determining that the road surface is slippery in a case in which a variance of the confidence interval width calculated for the predetermined zone is at least a predetermined threshold value.

5. The determining method according to claim 1, further comprising performing filtering for removing measurement errors of the slip ratio and the driving force, before the calculating a regression equation and a confidence interval width for a relationship between the slip ratio and the driving force.

6. The determining method according to claim 2, further comprising performing filtering for removing measurement errors of the slip ratio and the driving force, before the calculating a regression equation and a confidence interval width for a relationship between the slip ratio and the driving force.

7. The determining method according to claim 3, further comprising performing filtering for removing measurement errors of the slip ratio and the driving force, before the calculating a regression equation and a confidence interval width for a relationship between the slip ratio and the driving force.

8. A determining device for determining a state of a road surface on which a vehicle travels, comprising:
a rotational speed acquiring portion configured to sequentially acquire a rotational speed of tires mounted on the vehicle;
a driving force acquiring portion configured to sequentially acquire a driving force of the vehicle;
a slip ratio calculating portion configured to calculate a slip ratio based on the sequentially acquired rotational speed of the tires;
a confidence interval width calculating portion configured to calculate a regression equation and a confidence interval width representing a relationship between the slip ratio and the driving force, based on a large number of data sets of the slip ratio and the driving force in a predetermined zone; and
a determining portion configured to determine a state of the road surface, based on the confidence interval width calculated for the predetermined zone.

9. A non-transitory computer-readable medium storing a determining program for determining a state of a road surface on which a vehicle travels, the determining program causing a computer to execute:
sequentially acquiring a rotational speed of tires mounted on the vehicle;
sequentially acquiring a driving force of the vehicle;
calculating a slip ratio based on the sequentially acquired rotational speed of the tires;
calculating a regression equation and a confidence interval width for a relationship between the slip ratio and the driving force, based on a large number of data sets of the slip ratio and the driving force in a predetermined zone; and
determining a state of the road surface on which the vehicle travels, based on the confidence interval width calculated for the predetermined zone.

* * * * *